US012749805B2

(12) United States Patent
Liu et al.

(10) Patent No.: US 12,749,805 B2
(45) Date of Patent: Sep. 29, 2026

(54) DEVICE FOR ENABLING MOBILE COMMUNICATION TERMINAL TO EXCHANGE INFORMATION UNDERWATER THROUGH ELECTROMAGNETIC WAVES

(71) Applicant: DIVEVOLK PTE. LTD., Singapore (SG)

(72) Inventors: Songdong Liu, Zhuhai (CN); Jinsong Liu, Zhuhai (CN); Zhili Chen, Zhuhai (CN); Duo Qin, Zhuhai (CN); Bing Huang, Zhuhai (CN); Kai Zhang, Zhuhai (CN)

(73) Assignee: DIVEVOLK PTE. LTD., Singapore (SG)

( * ) Notice: Subject to any disclaimer, the term of this patent is extended or adjusted under 35 U.S.C. 154(b) by 126 days.

(21) Appl. No.: 18/940,781

(22) Filed: Nov. 7, 2024

(65) Prior Publication Data

US 2025/0158274 A1 May 15, 2025

(30) Foreign Application Priority Data

Nov. 9, 2023 (CN) ......................... 202311488453.9
Oct. 29, 2024 (CN) ......................... 202411520862.7

(51) Int. Cl.
*H01Q 1/50* (2006.01)
*H01Q 1/12* (2006.01)
(Continued)

(52) U.S. Cl.
CPC ............. *H01Q 1/50* (2013.01); *H01Q 1/1235* (2013.01); *H01Q 3/02* (2013.01); *H04B 13/02* (2013.01)

(58) Field of Classification Search
CPC ........ H01Q 1/1235; H01Q 1/50; H01Q 1/084; H01Q 1/10; H01Q 1/1264; H01Q 1/244;
(Continued)

(56) References Cited

U.S. PATENT DOCUMENTS 12,269,621 B1 * 4/2025 Perritt, Jr. .............. B64U 10/13
2007/0040753 A1 * 2/2007 Lee ........................ H02G 11/02 343/702
2011/0162573 A1 * 7/2011 Race ........................ H01Q 1/04 114/328

FOREIGN PATENT DOCUMENTS

CN 114374442 A 4/2022

* cited by examiner

*Primary Examiner* — Wei (Victor) Y Chan
(74) *Attorney, Agent, or Firm* — Rondaus PLLC; George Liu

(57) ABSTRACT

Provided is a device for enabling a mobile communication terminal to exchange information underwater through electromagnetic waves, including an electromagnetic wave transceiver unit, a cable take-up reel, and a fixing support, wherein the electromagnetic wave transceiver unit is configured to achieve the wireless information interaction between the device and the intelligent mobile terminal through an antenna contained therein; the cable take-up reel is configured to realize the retraction and release of a cable, fix the antenna and make same rotate synchronously with the cable take-up reel; and the fixing support is configured to maintain a fixed relative position between the intelligent mobile terminal and the device. The present disclosure adopts an electromagnetic wave wireless connection between the cable and the underwater intelligent mobile terminal for information exchange, and on this basis, employs an underwater cable take-up structure, thus greatly solving the problem of serious lack in safety and maneuverability.

20 Claims, 10 Drawing Sheets

(51) Int. Cl.
*H01Q 3/02* (2006.01)
*H04B 13/02* (2006.01)

(58) Field of Classification Search
CPC ........ H01Q 1/245; H01Q 1/3275; H01Q 1/44; H01Q 3/01; H01Q 9/14; H01Q 9/32; H01Q 1/04; H01Q 1/1207; H01Q 1/30; H01Q 3/02
See application file for complete search history.

DEVICE FOR ENABLING MOBILE COMMUNICATION TERMINAL TO EXCHANGE INFORMATION UNDERWATER THROUGH ELECTROMAGNETIC WAVES

TECHNICAL FIELD

The present disclosure relates to the field of machinery, in particular to the field of underwater wireless communication equipment, and more particularly, to a device for enabling a mobile communication terminal to exchange information underwater through electromagnetic waves.

BACKGROUND

At present, mobile communication has become an indispensable and most commonly used way for people to communicate with the outside world, and its terminal devices have almost spread to everyone, with the most widely used being mobile smartphones. How to effectively, safely and conveniently transmit the electromagnetic wave signals of an intelligent mobile terminal brought underwater to the water surface and directly to the Internet and other general communication systems has become a new problem.

The main way of the existing technical solution is that one end of a communication cable is electrically connected directly to a physical interface of an underwater intelligent mobile terminal, the underwater intelligent mobile terminal transmits electrical signals to the water surface through the communication cable, and then operators on the water handle a connection with the Internet. The biggest problem and disadvantage of this technology is that the retract and release of the cable need to be completed by the operators on the water surface. In complex underwater environments, in order to avoid and deal with the winding and pulling between the cable and underwater objects, one or even multiple people are required to maintain the cable underwater. Even so, people carrying underwater intelligent mobile terminal are still in a relatively unsafe state, and their mobility is limited by surface personnel. The safety and mobility of personnel and equipment are low during the entire operation process, and the operating cost is high (requiring multi-person cooperation). Therefore, the application is not very widely and can hardly be used for general personal consumption.

SUMMARY

In view of the background, it is necessary for the present disclosure to provide a device capable of effectively, safely and conveniently transmitting the electromagnetic wave signals of an intelligent mobile terminal brought underwater to the water surface and directly to the Internet and other general communication systems.

In order to achieve the above objectives, the present disclosure adopts the following technical solutions:

A device for enabling a mobile communication terminal to exchange information underwater through electromagnetic waves includes an electromagnetic wave transceiver unit, a cable take-up reel, and a fixing support, where the electromagnetic wave transceiver unit includes an antenna, and the antenna is configured to achieve wireless information exchange between the electromagnetic wave transceiver unit and the intelligent mobile terminal; the cable take-up reel is configured to realize the retraction and release of a cable, fix the antenna and make same rotate synchronously with the cable take-up reel; and the fixing support is configured to fix the intelligent mobile terminal.

Further, the electromagnetic wave transceiver unit further includes the cable, an antenna base, a waterproof protective cover and a filling port sealing cover, where the antenna base is available for installation of the antenna, the positive and negative poles of the cable are electrically connected to the positive and negative poles of the antenna respectively, the waterproof protective cover is arranged on the side of the antenna base where the antenna is located, the antenna is covered by the waterproof protective cover, and there is zero clearance fit between the side wall of the waterproof protective cover and the antenna base; the antenna is located inside a closed space formed by the antenna base and the waterproof protective cover; and a waterproof protective filling body is injected into the closed space from a filling port of the waterproof protective cover, and the filling port sealing cover is used for sealing the filling port.

Preferably, the PCB-mounted antenna is arranged on a PCB, and the PCB is attached to the inner surface of the waterproof protective cover.

Further, the cable is located on the other side of the antenna base opposite to the PCB-mounted antenna, one end of the cable passes through the antenna base and then is electrically connected to the PCB-mounted antenna, and the connection part between the cable and the antenna base is in a sealed state.

Preferably, the antenna base is provided with a plurality of protrusions and grooves facing the surface of the antenna.

Further, the cable take-up reel includes a reel body, the end portion of a spool of the reel body is fixed to the other side of the antenna base opposite to the antenna, the cable is wound on the spool, and the retraction and release of the cable is implemented by the forward and reverse rotation of the reel body.

Further, the cable take-up reel further includes a reel fixing plate, a rotating drive plate and a rotatable handle, where the reel fixing plate is in clearance fit with the outer side of the reel body, the rotating drive plate is arranged at the outer side of the reel fixing plate, the center of the reel body is provided with a first protruding portion, the first protruding portion passes through the reel fixing plate and then is fixedly fitted with the rotating drive plate, and the rotatable handle is fixedly fitted with the rotating drive plate; and when the reel fixing plate is fixed, the rotatable handle is rotated, and the antenna base and the reel body are driven by the rotating drive plate to make forward and reverse rotation relative to the reel fixing plate.

Preferably, the center of the reel body is provided with a circular groove, the circular groove is located inside the spool, a circular protruding portion is provided in the center of the reel fixing plate, and the reel body and the reel fixing plate are in clearance fit with each other through the circular groove and the circular protruding portion; the first protruding portion is located in the center of the circular groove, and the center of the circular protruding portion is provided with a through hole; and after passing through the through hole, the first protruding portion is fixedly fitted with the rotating drive plate.

Preferably, a plurality of second protruding portions are provided on the inner surface of the reel fixing plate, the second protruding portions are in clearance fit with the surface of the reel body, and the reel fixing plate is provided with a plurality of first punched holes along the circumferential direction; and the rotating drive plate is provided with a plurality of third protruding portions, the third protruding portions are in clearance fit with the surface of the reel fixing plate, and the rotating drive plate is provided with a plurality of second punched holes along the circumferential direction.

Preferably, the cable take-up reel further includes a cable guide body, and the cable guide body is fixedly connected to the reel fixing plate, or the cable guide body is integrated with the reel fixing plate; the cable guide body is in a hollow frame shape; the cable guide body includes two opposite connecting rods, each of the surfaces of the connecting rods is covered with a damping rubber layer, and the distance between the outer surfaces of the damping rubber layers of the two connecting rods is smaller than the outer diameter of the cable; and one end of the cable passes through the cable guide body.

Further, the fixing support includes a left/right grip, an upper connecting rod, a lower connecting rod, and a left/right connecting arm, where both ends of the upper connecting rod are used for fixing the left and right sides of the upper part of the waterproof intelligent mobile terminal or a waterproof protective case of the intelligent mobile terminal, the lower connecting rod is used for limiting the waterproof intelligent mobile terminal or the lower end of the waterproof protective case of the intelligent mobile terminal, the two ends of the upper connecting rod and the lower connecting rod are respectively and fixedly connected to the left/right grip, one end of the left/right connecting arm is fixedly connected to the reel fixing plate, and the other end of the left/right connecting arm is fixedly connected to one end of the left/right grip.

Preferably, the fixing support further includes upper press plates and a lower press plate, where the upper press plates are fixed to the outer surface of the upper connecting rod, and the lower press plate is fixed to the outer surface of the lower connecting rod.

Preferably, the cable take-up reel further includes a rotary control trigger, one end of the rotary control trigger is connected to the upper connecting rod by means of a rotating shaft, a protruding portion is provided at the end portion of the rotary control trigger away from the rotating shaft, the position of the rotary control trigger close to the rotating shaft is provided with a press end, a spring is arranged between the rotary control trigger and the upper connecting rod, the spring is located at a position between the press end and the protruding portion, a plurality of inclined protrusions are provided around the surface of the antenna base, and the inclined protrusions are in an inverted buckle fit with the protruding portion of the rotary control trigger; when the rotary control trigger is not pulled down, the cable can only be retracted; and after the rotary control trigger is pulled down, the cable can be retracted and released.

Further, one end of the left/right connecting arm is fixedly connected to the reel fixing plate, and the other end thereof is fixedly connected to one end of the left/right grip, so that the surface of the waterproof protective cover and the corresponding surface of the waterproof intelligent mobile terminal or its waterproof protective case form a close spaced relationship, and the friction between the reel body and the waterproof intelligent mobile terminal or its waterproof protective case is avoided when the reel body rotates. Furthermore, the spring enables a zero clearance fit between the protrusion of the rotary control trigger and the surface of the antenna base.

Further, the left/right grip is provided with a plurality of metal nuts, the metal nuts are embedded on the left/right grip, and the metal nuts are used for providing interfaces for connection and fixation of other accessory devices.

Preferably, the edge of the antenna base is designed as a toothed structure. A user can toggle the toothed edge of the antenna base by fingers while holding a support handle with one hand underwater, so that the cable can be retracted without rotating the rotatable handle.

Preferably, there are two fulcrums at the bottom of the left/right grip, the four fulcrums of the left and right grips are located on the same horizontal plane, and the four fulcrums are used for support.

Compared with the prior art, the present disclosure has the following beneficial effects.

The present disclosure adopts an electromagnetic wave wireless connection between the cable and the underwater intelligent mobile terminal for information exchange, and on this basis, employs an underwater cable take-up structure, thus greatly solving the problem of serious lack in safety and maneuverability. Combined with the unmanned surface vehicle, it can be operated by one person; and the entire device adopts a portable design that is easy to store, making the product more suitable for ordinary consumers.

In combination with the unmanned surface vehicle, the present disclosure can enable individual consumers to carry their own intelligent mobile terminals to realize the connection between underwater and the Internet, can carry out real-time interaction, and is better in security and maneuverability, which greatly expands the application scope and scenarios (market boundary), thus having broad market prospects and better social benefits.

DETAILED DESCRIPTION OF THE EMBODIMENTS

The present disclosure will be further described in detail below with reference to specific embodiments.

Figure 1:
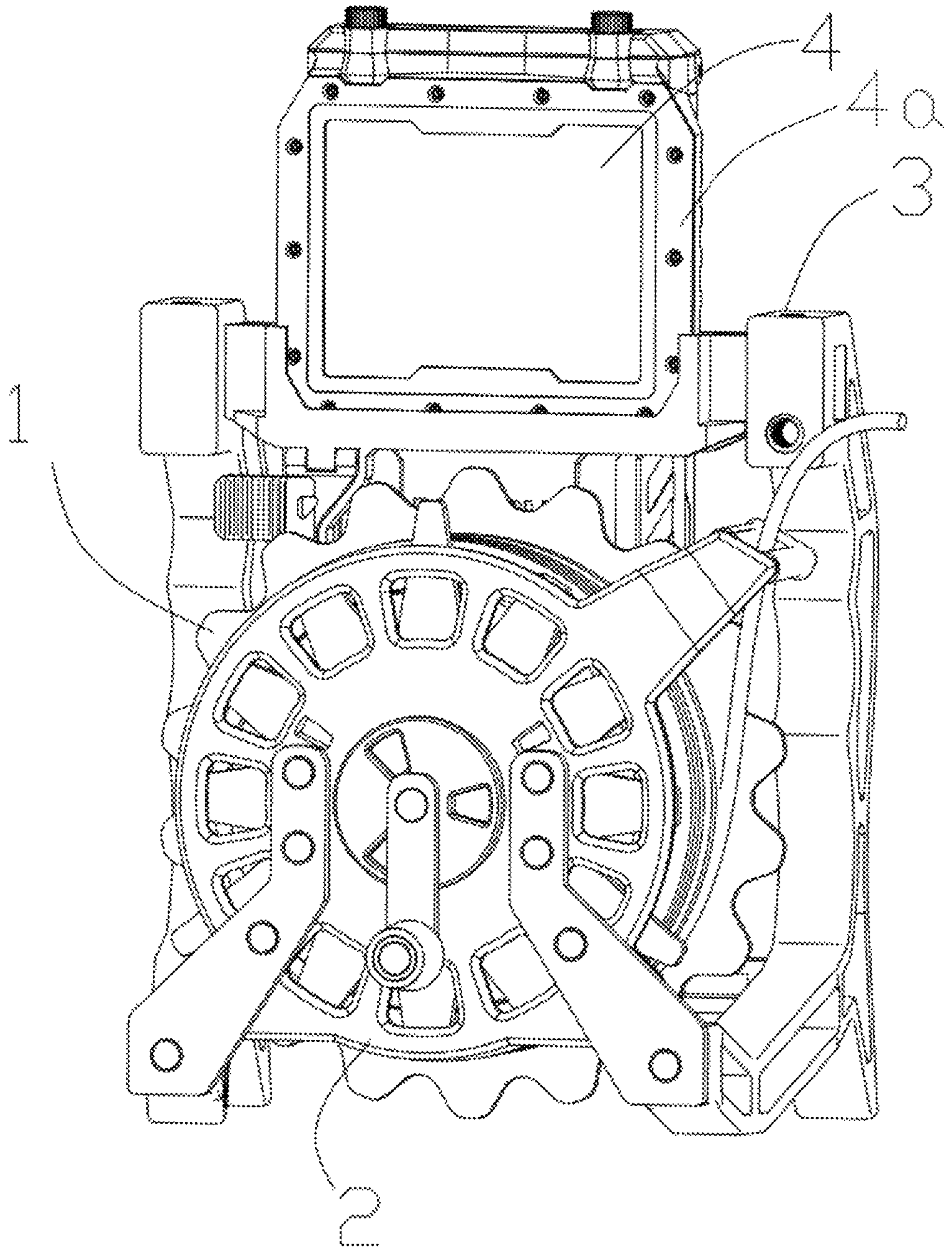
FIG. 1 is a schematic diagram of the three-dimensional structure showing the connection between a mobile terminal and a device for enabling a mobile communication terminal to exchange information underwater through electromagnetic waves according to an embodiment of the present disclosure.

This embodiment provides a device for enabling a mobile communication terminal to exchange information underwater through electromagnetic waves, which is composed of an electromagnetic wave transceiver unit 1, a cable take-up reel 2, and a fixing support 3, as shown in FIG. 1.

The function of the electromagnetic wave transceiver unit 1 is to realize bidirectional conversion between electromagnetic waves and alternating voltages through a PCB-mounted antenna contained therein, thereby realizing information exchange between the device according to the embodiment and an intelligent mobile terminal 4 in a wireless manner. This is also the basic condition for cable retraction and release by underwater operators.

The functions of the cable take-up reel 2 are to achieve the retraction and release of a cable, fix the PCB-mounted antenna and make same rotate synchronously with the cable take-up reel.

The functions of the fixing support 3 are to maintain a fixed relative position between the intelligent mobile terminal 4 and the device, serve as a grip for an operator to hold the device, and also serve as a fixing support for external connection of other accessories (such as a diving light, a camera lens, and a buoyancy arm).

Figure 2:
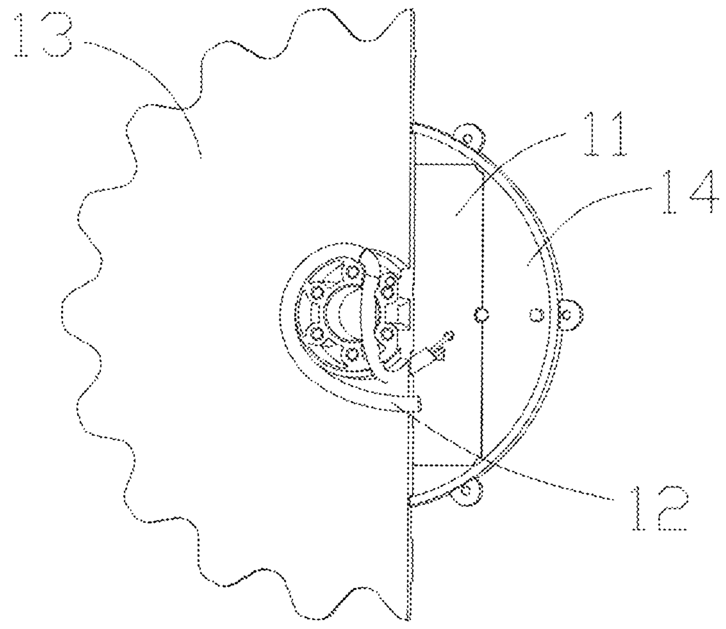
FIG. 2 is a schematic diagram of the structure of an electromagnetic wave transceiver unit according to an embodiment of the present disclosure; in the figure, an antenna base and a waterproof protective cover are in a split state.

The details are as follows:

As shown in FIG. 2, the electromagnetic wave transceiver unit 1 includes the PCB-mounted antenna 11 (antenna 11), the cable 12, an antenna base 13, a waterproof protective cover 14 and a filling port sealing cover 16. The antenna base 13 is available for installation of PCB-mounted antenna 11, the positive and negative poles at one end of the cable 12 are electrically connected to the positive and negative poles of the PCB-mounted antenna 11 respectively, the waterproof protective cover 14 is arranged on the side of the antenna base 13 where the PCB-mounted antenna 11 is located, the PCB-mounted antenna 11 is covered by the waterproof protective cover 14, and there is zero clearance fit between the edge of the side wall of the waterproof protective cover 14 and the surface of the antenna base 13 to achieve waterproof sealing, so that the antenna base 13 and the waterproof protective cover 14 form a closed space; the PCB-mounted antenna 11 is located inside the closed space; and a waterproof protective filling body 15 is injected into the closed space from a filling port of the waterproof protective cover 14, and the filling port sealing cover 16 is used for sealing the filling port.

Figure 3:
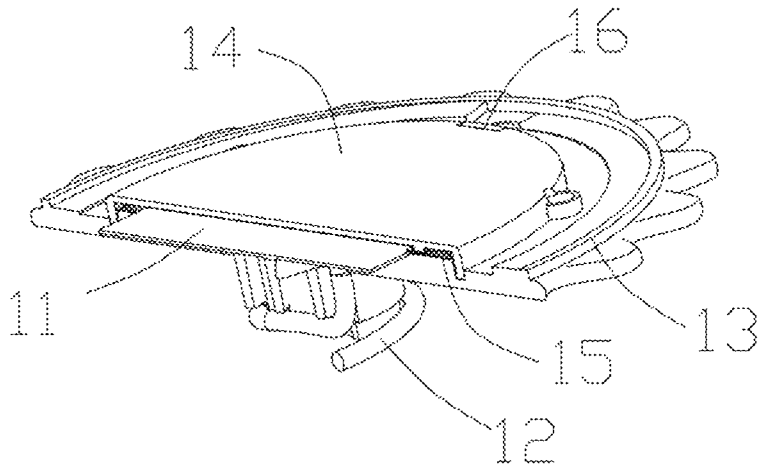
FIG. 3 is a schematic diagram of the structural relationship of a cable, a PCB-mounted antenna, and the antenna base; in the figure, the antenna base on the right side is split and removed.

As shown in FIG. 3, the antenna base 13 is provided with a circular hole through which the cable 12 passes; the inner diameter of the circular hole is slightly smaller than the outer diameter of an insulating protective layer of the cable 12; and the insulating protective layer of the cable 12 has a certain flexibility, so that after the cable 12 passes through the circular hole, the circular hole is in a sealed state. The surface of a PCB 11*a* where the PCB-mounted antenna 11 is located is attached to the inner surface of the waterproof protective cover 14. The outer side edge of the waterproof protective cover 14 is embedded into the surface of the antenna base 13, and there is zero clearance fit at the connecting part between the waterproof protective cover and the antenna base.

Figure 4:
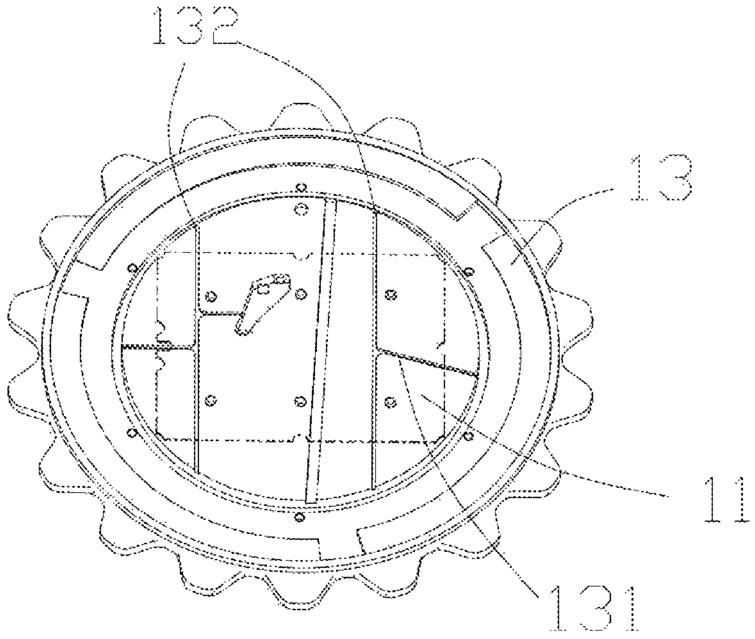
FIG. 4 is a schematic diagram of the structural relationship between the antenna base and the PCB-mounted antenna.

As shown in FIG. 4, the antenna base 13 is provided with a plurality of protrusions 131 facing the surface of the PCB-mounted antenna 11, so as to ensure a certain gap between the PCB-mounted antenna 11 and the antenna base 13. Meanwhile, the surface of the antenna base 13 facing the PCB-mounted antenna 11 is further provided with one or more grooves 132, and the protrusions 131 and the grooves 132 can ensure smooth filling of the waterproof protective filling body 15.

Figure 5:
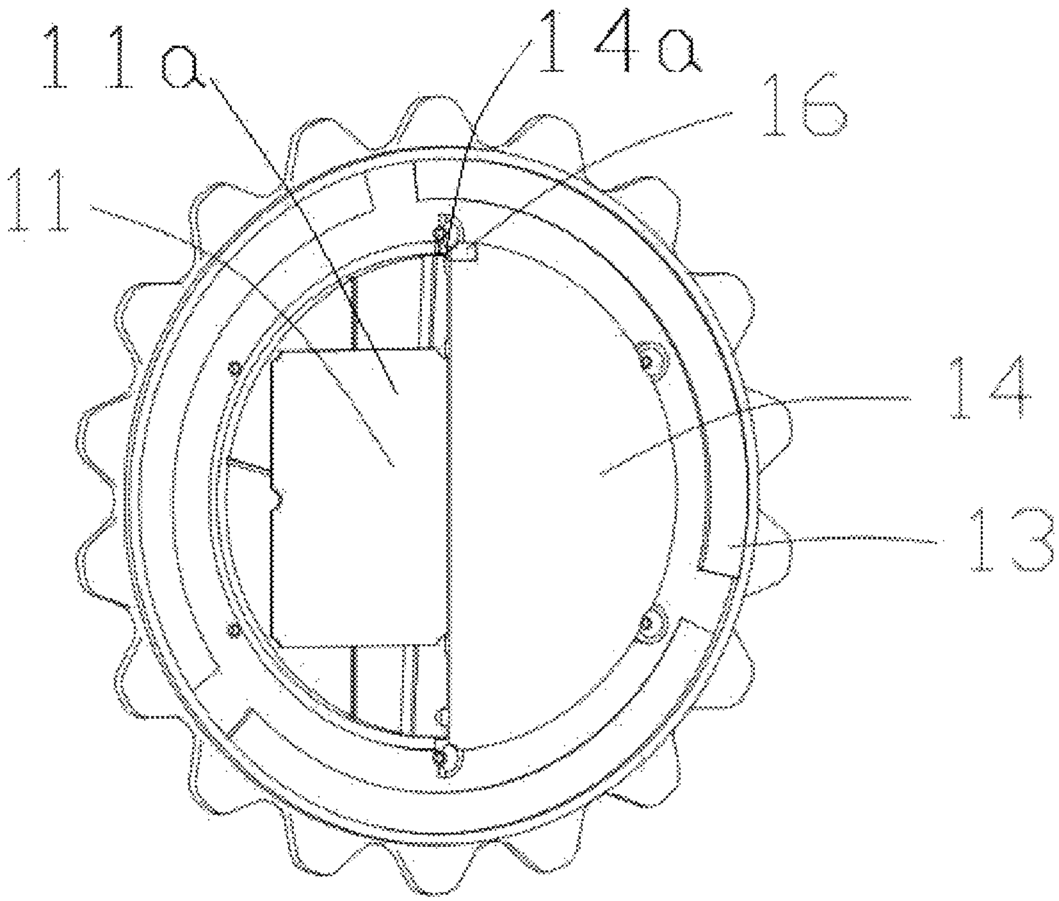
FIG. 5 is a schematic diagram of the structural relationship of the antenna base, the PCB-mounted antenna, and a waterproof protective cover; in the figure, the waterproof protective cover on the left side is perspective.

As shown in FIG. 5, the waterproof protective filling body 15 is injected into the closed space from the filling port 14*a* of the waterproof protective cover 14, and after filling is completed, the filling port 14*a* is sealed by the filling port sealing cover 16, so that the antenna base 13 and the waterproof protection cover 14 are enabled to be tightly matched with each other to form a completely sealed state. The waterproof protective filling body 15 is made of an insulating sealing material, and after a certain period of time, the waterproof protective filling body 15 is irreversibly and permanently cured by fluid. By adopting a toothed structure, the antenna base 13 can be toggled with one hand, which drives the cable take-up reel 2 to rotate for the retraction and release of the cable.

Figure 6:
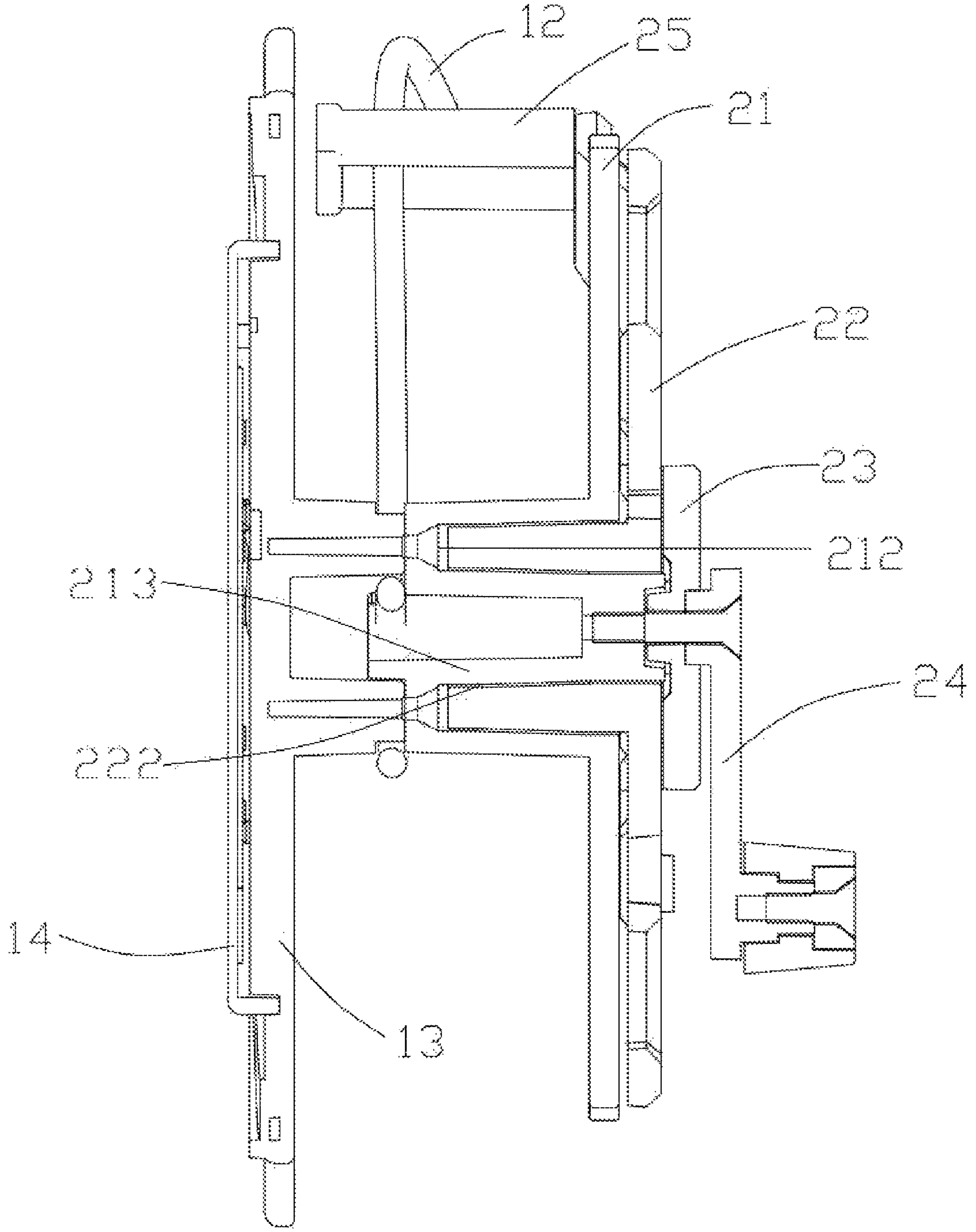
FIG. 6 is a schematic diagram of the cross-sectional structure showing the combination of the electromagnetic wave transceiver unit and a cable take-up reel according to the embodiment of the present disclosure.
Figure 7:
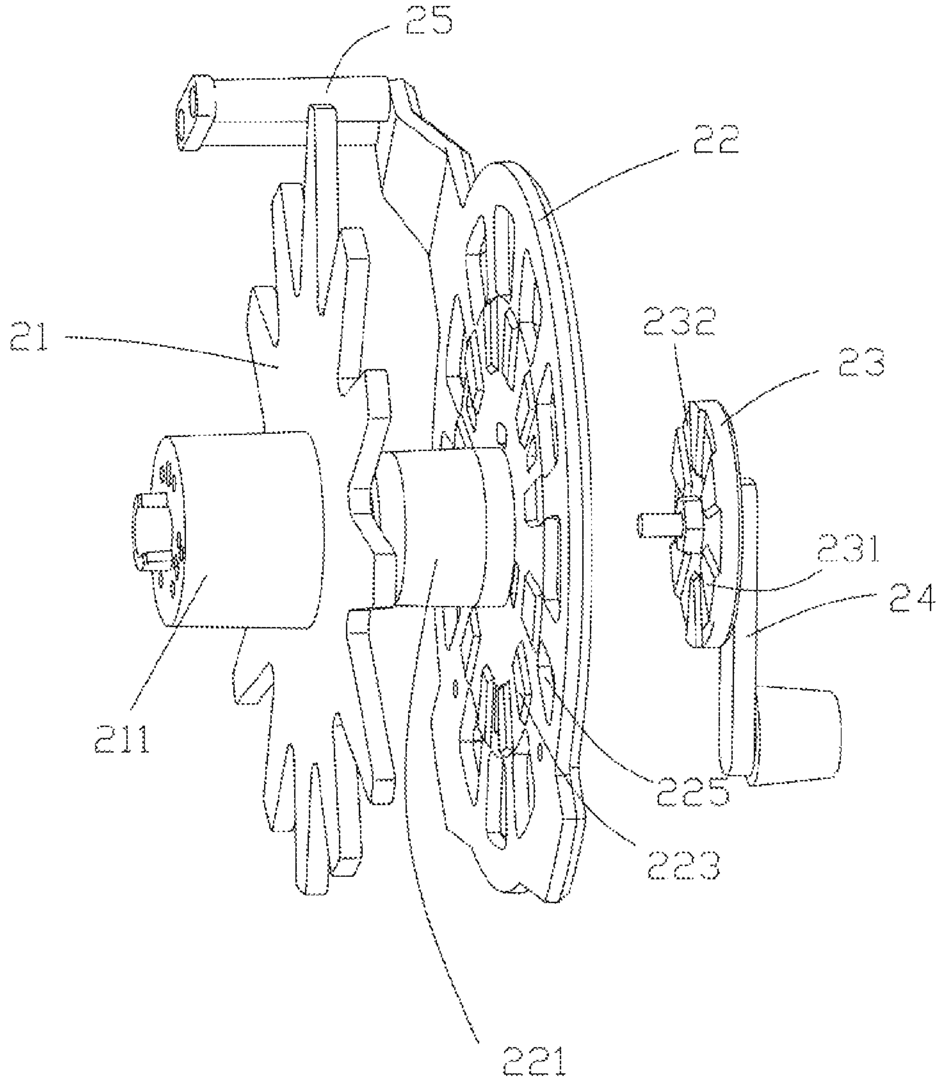
FIG. 7 is a schematic diagram of the structural relationship of a reel body, a reel fixing plate, and a rotating drive plate.

As shown in FIG. 6 and FIG. 7, the cable take-up reel 2 includes a reel body 21, a reel fixing plate 22, a rotating drive plate 23, a rotatable handle 24, a rotary control trigger 27, and a spring 28. The antenna base 13 and the end portion of a spool 211 of the reel body 21 are fixed together by screws to form an antenna reel assembly; the cable 12 is located between the antenna base 13 and the reel body 21; and specifically, the cable 12 is wound on the spool 211 of the reel body 21. The retraction and release of the cable 12 can be achieved by the forward and reverse rotation of the reel body 21.

A circular groove 212 is formed in the side face of the reel body 21 facing the reel fixing plate 22; the circular groove 212 is located in the center of the reel body 21, and the circular groove 212 is provided inside the spool 211 and is coaxial with the spool 211. A circular protruding portion 221 matching the circular groove 212 is provided in the center of the reel fixing plate 22, and the reel body 21 and the reel fixing plate 22 are in clearance fit with each other through the circular groove 212 and the circular protruding portion 221.

The rotating drive plate 23 is arranged at the outer side of the reel fixing plate 22. The center of the circular groove 212 of the reel body 21 is provided with a first protruding portion 213, a through hole 222 is reserved in the center of the circular protruding portion 221 of the reel fixing plate 22, and the first protruding portion 213 passes through the through hole 222, so that the reel body 21 is fixedly fitted with the rotating drive plate 23, and the rotatable handle 24 is fixedly fitted with the rotating drive plate 23; and when the reel fixing plate 22 is fixed, the rotatable handle 24 is rotated, and the antenna reel assembly is driven by the rotating drive plate 23 to make forward and reverse rotation relative to the reel fixing plate 22.

A plurality of second protruding portions 223 are provided on the surface of the reel fixing plate 22 facing the reel body 21, the second protruding portions 223 are in clearance fit with the surface of the reel body 21, and the reel fixing plate 22 is provided with a plurality of first punched holes 225 along the circumferential direction; and a plurality of third protruding portions 231 are provided on the surface of the rotating drive plate 23 facing the reel fixing plate 22, the third protruding portions 231 are in clearance fit with the surface of the reel fixing plate 22, and the rotating drive plate 23 is provided with a plurality of second punched holes 232 along the circumferential direction. The above features are designed to reduce the rotational friction of the device, also to cope with the impact of mud, sand and other floating objects in the underwater environment on the rotational operation, and to flush the device with clean water after use, thus prolonging the service life of the device.

Figure 8:
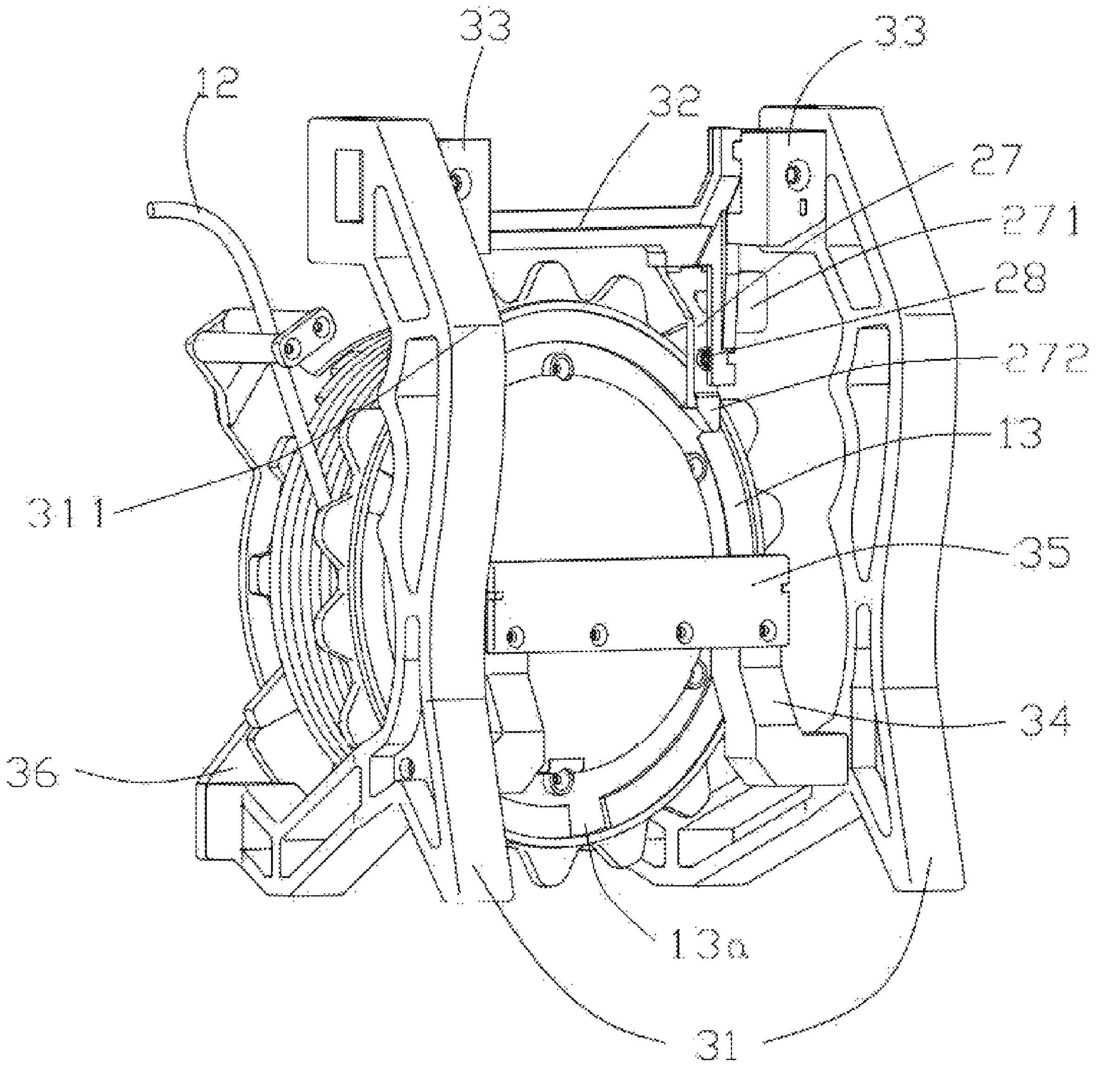
FIG. 8 is a schematic diagram of the three-dimensional structure of the device from the back perspective according to the embodiment of the present disclosure.

As shown in FIG. 8, the reel fixing plate 22 is provided with a cable guide body 25, and the cable guide body 25 is fixedly connected to the reel fixing plate 22, or the cable guide body 25 is integrated with the reel fixing plate 22. An opening of the cable guide body 25 is rectangular, and the long sides of the cable guide body 25 is facing a reel space formed by the antenna base 13 and the reel body 21, so that the cable is ensured to be relatively neat in winding displacement when being retracted. Damping rubber layers 26 are wrapped around the connecting rods 251 on the opposite sides of the cable guide body 25, and the distance between the two damping rubber layers 26 is slightly smaller than the outer diameter of the cable 12, so as to achieve a suitable damping effect for retracting/releasing.

Figure 9:
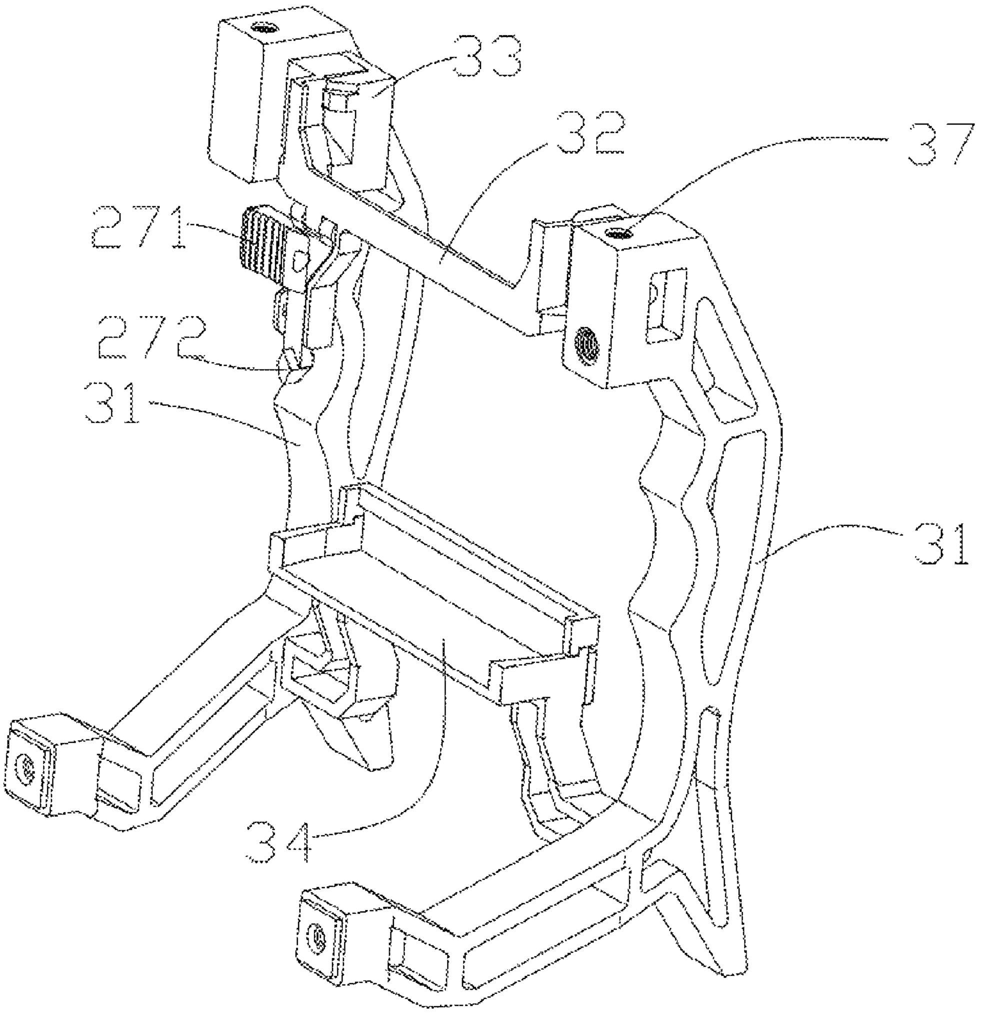
FIG. 9 is a schematic diagram of the three-dimensional structure of a fixing support.

As shown in FIG. 9, the fixing support is composed of a left/right grip 31, an upper connecting rod 32, upper press plates 33, a lower connecting rod 34, a lower press plate 35, and a left/right connecting arm 36. The two ends of the upper connecting rod 32 and the lower connecting rod 34 are fixedly combined with the left/right grip 31 to form a stable whole, and four fulcrums 311 at the lower ends of the left and right grips 31 are located on the same plane, so that the device can be stably placed. The two ends of the upper connecting rod 32 are used for fixing the left and right sides of the upper part of the intelligent mobile terminal 4 or a waterproof protective case 4*a* of the intelligent mobile terminal 4, the lower connecting rod 33 is used for limiting the lower end of the intelligent mobile terminal 4 or the waterproof protective case 4*a* of the intelligent mobile terminal 4, and the left and right ends of the upper connecting rod 32 and the lower connecting rod 33 are separately and fixedly combined with the left/right grip 11. The upper press plates 33 are fixed to the outer surface of the upper connecting rod 32 by screws, and the lower press plate 35 is fixed to the outer surface of the lower connecting rod 34 by screws, so that the intelligent mobile terminal 4 or the waterproof protective case 4*a* of the intelligent mobile terminal 4 is completely fixed with the fixing support in three dimensions.

Figure 10:
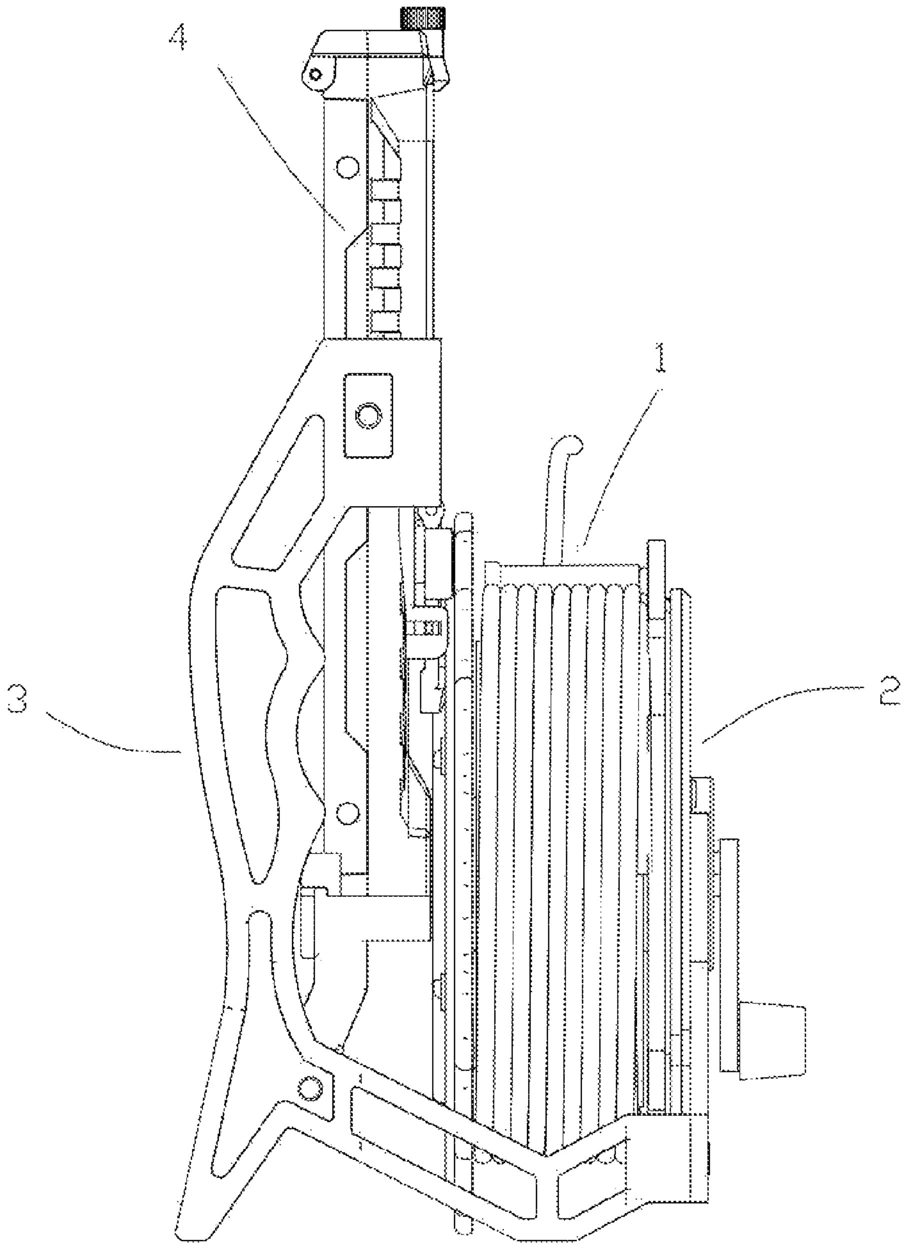
FIG. 10 is a schematic diagram of the three-dimensional structure of the device combined with the mobile communication terminal according to the embodiment of the present disclosure.
Figure 11:
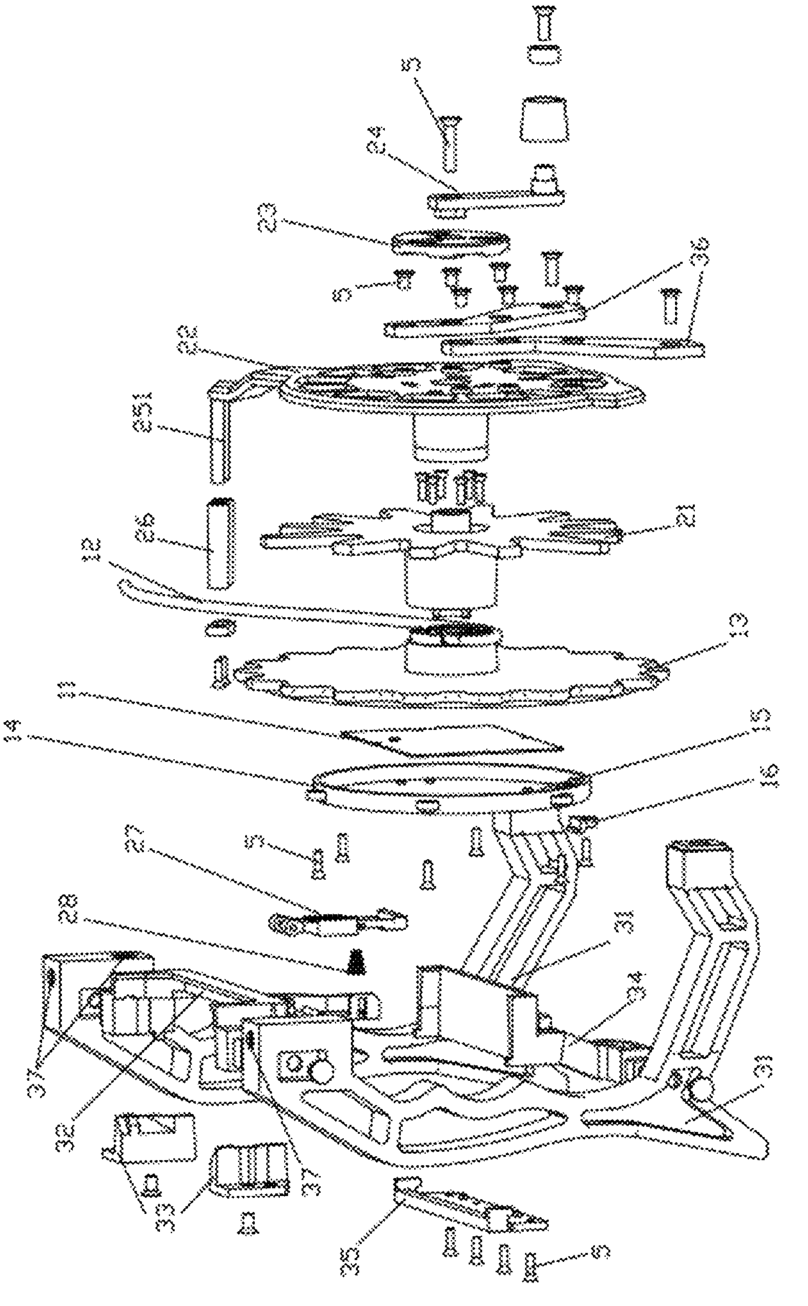
FIG. 11 is an exploded view of the device according to the embodiment of the present disclosure.

As shown in FIG. 8, FIG. 10, and FIG. 11, one end of the rotary control trigger 27 is connected to the upper connecting rod 32 by means of a rotating shaft 29, a protruding portion 272 is provided at the end portion of the rotary control trigger 27 away from the rotating shaft, the position of the rotary control trigger 27 close to the rotating shaft is provided with a press portion 271, a spring 28 is arranged between the rotary control trigger 27 and the upper connecting rod 32, the spring 28 is located at a position between the press portion 271 and the protruding portion 272, a plurality of inclined protrusions 13*a* are provided around the surface of the antenna base 13, and the inclined protrusions 13*a* are in an inverted buckle fit with the protruding portion 272; when the rotary control trigger 27 is not pulled down, it can only rotate in the direction of retracting the cable 12, but cannot release the cable 12; and after the rotary control trigger 27 is pulled down, the cable 12 can be retracted and released. The purpose of this design is to control the release of the cable 12 according to needs, so as to avoid potential safety hazards to the device and underwater operators caused by excessive release of the cable 12. Moreover, this design conforms to people's habit of holding the left/right grip 3 with both hands and pulling the trigger with the index finger, and thus can realize the control of releasing the cable 12 with one hand. As can be seen in FIG. 11, the various adjacent components are fixedly connected by screws 5.

As shown in FIG. 10, the surface shape and size of the upper connecting rod 32 and the lower connecting rod 34 are respectively matched with the surface shape of the intelligent mobile terminal 4 or the waterproof protective case 4*a* of the intelligent mobile terminal 4, so that the horizontal and vertical relative fixation can be realized after the combination therebetween.

One end of the left/right connecting arm 36 is fixedly connected to the corresponding position on the reel fixing plate 26, and the other end thereof is fixedly connected to one end of the left/right grip 31, so that the surface of the waterproof protective cover 14 of the electromagnetic wave transceiver unit and the corresponding surface of the intelligent mobile terminal 4 or the waterproof protective case 4*a* of the intelligent mobile terminal 4 form a close spaced relationship, and minimal attenuation of electromagnetic wave signals is further ensured; and furthermore, there is a zero clearance fit relationship between the protrusion at one end of the rotary control trigger 27 and the surface of the antenna base 13, thus ensuring the effective control of the cable release by the rotary control trigger 27.

As shown in FIG. 9, the left/right grip 31 is provided with a plurality of embedded metal nuts 37*a*, which serve as accessory extension interfaces 37. Their function functions are to provide interfaces for connection and fixation of accessory devices (such as a diving light, a camera lens, and a buoyancy arm).

What is claimed is:

1. A device for enabling a mobile communication terminal to exchange information underwater through electromagnetic waves, comprising an electromagnetic wave transceiver unit, a cable take-up reel, and a fixing support, wherein the electromagnetic wave transceiver unit comprises an antenna, and the antenna is configured to achieve wireless information exchange between the electromagnetic wave transceiver unit and the intelligent mobile terminal; the cable take-up reel is configured to realize the retraction and release of a cable, fix the antenna and make same rotate synchronously with the cable take-up reel; and the fixing support is configured to fix the intelligent mobile terminal.

2. The device according to claim 1, wherein the electromagnetic wave transceiver unit further comprises the cable, an antenna base, and a waterproof protective cover, wherein the antenna base is available for installation of the antenna, the positive and negative poles of the cable are electrically connected to the positive and negative poles of the antenna respectively, the waterproof protective cover is arranged on the side of the antenna base where the antenna is located, the antenna is covered by the waterproof protective cover, and there is zero clearance fit between the side wall of the waterproof protective cover and the antenna base; the antenna is located inside a closed space formed by the antenna base and the waterproof protective cover.

3. The device according to claim 2, the electromagnetic wave transceiver unit further comprises a filling port sealing cover, and a waterproof protective filling body is injected into the closed space from a filling port of the waterproof protective cover, and the filling port sealing cover is used for sealing the filling port.

4. The device according to claim 2, wherein the antenna is a PCB-mounted antenna, the PCB-mounted antenna is arranged on a PCB, and the PCB is attached to the inner surface of the waterproof protective cover.

5. The device according to claim 4, wherein the cable is located on the other side of the antenna base opposite to the PCB-mounted antenna, one end of the cable passes through the antenna base and then is electrically connected to the PCB-mounted antenna, and the connection part between the cable and the antenna base is in a sealed state.

6. The device according to claim 2, wherein the cable take-up reel comprises a reel body, the end portion of a spool of the reel body is fixed to the other side of the antenna base opposite to the antenna, the cable is wound on the spool, and the retraction and release of the cable is implemented by the forward and reverse rotation of the reel body.

7. The device according to claim 6, wherein the cable take-up reel further comprises a reel fixing plate, a rotating drive plate and a rotatable handle, wherein the reel fixing plate is in clearance fit with the outer side of the reel body, the rotating drive plate is arranged at the outer side of the reel fixing plate, the center of the reel body is provided with a first protruding portion, the first protruding portion passes through the reel fixing plate and then is fixedly fitted with the rotating drive plate, and the rotatable handle is fixedly fitted with the rotating drive plate; and when the reel fixing plate is fixed, the rotatable handle is rotated, and the antenna base and the reel body are driven by the rotating drive plate to make forward and reverse rotation relative to the reel fixing plate.

8. The device according to claim 7, wherein the center of the reel body is provided with a circular groove, the circular groove is located inside the spool, a circular protruding portion is provided in the center of the reel fixing plate, and the reel body and the reel fixing plate are in clearance fit with each other through the circular groove and the circular protruding portion; the first protruding portion is located in the center of the circular groove, and the center of the circular protruding portion is provided with a through hole; and after passing through the through hole, the first protruding portion is fixedly fitted with the rotating drive plate.

9. The device according to claim 8, wherein a plurality of second protruding portions are provided on the inner surface of the reel fixing plate, the second protruding portions are in clearance fit with the surface of the reel body, and the reel fixing plate is provided with a plurality of first punched holes along the circumferential direction; and the rotating drive plate is provided with a plurality of third protruding portions, the third protruding portions are in clearance fit with the surface of the reel fixing plate, and the rotating drive plate is provided with a plurality of second punched holes along the circumferential direction.

10. The device according to claim 6, wherein the cable take-up reel further comprises a cable guide body, and the cable guide body is fixedly connected to the reel fixing plate, or the cable guide body is integrated with the reel fixing plate; the cable guide body is in a hollow frame shape; the cable guide body comprises two opposite connecting rods, each of the surfaces of the connecting rods is covered with a damping rubber layer, and the distance between the outer surfaces of the damping rubber layers of the two connecting rods is smaller than the outer diameter of the cable; and one end of the cable passes through the cable guide body.

11. The device according to claim 7, wherein the cable take-up reel further comprises a cable guide body, and the cable guide body is fixedly connected to the reel fixing plate, or the cable guide body is integrated with the reel fixing plate; the cable guide body is in a hollow frame shape; the cable guide body comprises two opposite connecting rods, each of the surfaces of the connecting rods is covered with a damping rubber layer, and the distance between the outer surfaces of the damping rubber layers of the two connecting rods is smaller than the outer diameter of the cable; and one end of the cable passes through the cable guide body.

12. The device according to claim 8, wherein the cable take-up reel further comprises a cable guide body, and the cable guide body is fixedly connected to the reel fixing plate, or the cable guide body is integrated with the reel fixing plate; the cable guide body is in a hollow frame shape; the cable guide body comprises two opposite connecting rods, each of the surfaces of the connecting rods is covered with a damping rubber layer, and the distance between the outer surfaces of the damping rubber layers of the two connecting rods is smaller than the outer diameter of the cable; and one end of the cable passes through the cable guide body.

13. The device according to claim 9, wherein the cable take-up reel further comprises a cable guide body, and the cable guide body is fixedly connected to the reel fixing plate, or the cable guide body is integrated with the reel fixing plate; the cable guide body is in a hollow frame shape; the cable guide body comprises two opposite connecting rods, each of the surfaces of the connecting rods is covered with a damping rubber layer, and the distance between the outer surfaces of the damping rubber layers of the two connecting rods is smaller than the outer diameter of the cable; and one end of the cable passes through the cable guide body.

14. The device according to claim 7, wherein the fixing support comprises a left/right grip, an upper connecting rod, a lower connecting rod, and a left/right connecting arm, wherein both ends of the upper connecting rod are used for fixing the left and right sides of the upper part of the waterproof intelligent mobile terminal or a waterproof protective case of the intelligent mobile terminal, the lower connecting rod is used for limiting the waterproof intelligent mobile terminal or the lower end of the waterproof protective case of the intelligent mobile terminal, the two ends of the upper connecting rod and the lower connecting rod are respectively and fixedly connected to the left/right grip, one end of the left/right connecting arm is fixedly connected to the reel fixing plate, and the other end of the left/right connecting arm is fixedly connected to one end of the left/right grip.

15. The device according to claim 14, wherein the fixing support further comprises upper press plates and a lower press plate, wherein the upper press plates are fixed to the outer surface of the upper connecting rod, and the lower press plate is fixed to the outer surface of the lower connecting rod.

16. The device according to claim 14, wherein the cable take-up reel further comprises a rotary control trigger, one end of the rotary control trigger is connected to the upper connecting rod by means of a rotating shaft, a protruding portion is provided at the end portion of the rotary control trigger away from the rotating shaft, the position of the rotary control trigger close to the rotating shaft is provided with a press end, a spring is arranged between the rotary control trigger and the upper connecting rod, the spring is located at a position between the press end and the protruding portion, a plurality of inclined protrusions are provided around the surface of the antenna base, and the inclined protrusions are in an inverted buckle fit with the protruding portion of the rotary control trigger; when the rotary control trigger is not pulled down, the cable can only be retracted; and after the rotary control trigger is pulled down, the cable can be retracted and released.

17. The device according to claim 15, wherein the cable take-up reel further comprises a rotary control trigger, one end of the rotary control trigger is connected to the upper connecting rod by means of a rotating shaft, a protruding portion is provided at the end of the rotary control trigger away from the rotating shaft, the position of the rotary control trigger close to the rotating shaft is provided with a press end, a spring is arranged between the rotary control trigger and the upper connecting rod, the spring is located at a position between the press end and the protruding portion, a plurality of inclined protrusions are provided around the surface of the antenna base, and the inclined protrusions are in an inverted buckle fit with the protruding portion of the rotary control trigger; when the rotary control trigger is not pulled down, the cable can only be retracted; and after the rotary control trigger is pulled down, the cable can be retracted and released.

18. The device according to claim 15, wherein the left/right grip is provided with a plurality of metal nuts, the metal nuts are embedded on the left/right grip, and the metal nuts are used for providing interfaces for connection and fixation of other accessory devices.

19. The device according to claim 2, wherein the edge of the antenna base is designed as a toothed structure.

20. The device according to claim 15, wherein there are two fulcrums at the bottom of the left/right grip, the four fulcrums of the left and right grips are located on the same horizontal plane, and the four fulcrums are used for support.

* * * * *